(12) United States Patent
Bachmann

(10) Patent No.: US 6,588,360 B1
(45) Date of Patent: Jul. 8, 2003

(54) DETACHABLE PLANING ENHANCEMENT SYSTEM FOR INFLATABLE SPORTBOATS

(76) Inventor: Helmuth G. Bachmann, 1841 London Way, Salinas, CA (US) 93906

( * ) Notice: Subject to any disclaimer, the term of this patent is extended or adjusted under 35 U.S.C. 154(b) by 0 days.

(21) Appl. No.: 10/125,317

(22) Filed: Apr. 17, 2002

(51) Int. Cl.[7] .................................................. B63B 1/22
(52) U.S. Cl. ...................................... 114/284; 114/345
(58) Field of Search .......................... 114/271, 284–286, 114/345; D12/300, 317

(56) References Cited

U.S. PATENT DOCUMENTS

| | | |
|---|---|---|
| 1,752,406 A | 4/1930 | Wetch |
| 2,985,130 A | 5/1961 | Jacobs |
| D235,635 S | 7/1975 | Curtis |
| 4,323,027 A | 4/1982 | Schermerhorn |
| 4,519,336 A | 5/1985 | Mason |
| 4,858,550 A * | 8/1989 | Bellia .......................... 114/345 |
| 4,966,091 A * | 10/1990 | D'Aulan ...................... 114/345 |
| 4,967,682 A | 11/1990 | O'Donnell |
| 5,048,449 A | 9/1991 | Templeman |
| 5,215,029 A | 6/1993 | Davis |
| 5,224,436 A | 7/1993 | Stricker |
| D386,465 S | 11/1997 | Bachmann |
| 6,138,601 A | 10/2000 | Anderson et al. |
| 6,167,830 B1 | 1/2001 | Pilger |

* cited by examiner

Primary Examiner—Ed Swinehart

(57) ABSTRACT

A detachable planing enhancement system with two substantial planing surface areas attached symmetrically on the transom of an inflatable sportboat to provide a substantial lifting force thereon. The system includes a method of quick attachment and detachment to the transom of the inflatable sportboat and means to ventilate such planing surfaces with air to reduce drag at high planing speeds. The planing surfaces and attachment components are comprised of plastic compatible with the injection molding process of fabrication.

16 Claims, 5 Drawing Sheets

DETACHABLE PLANING ENHANCEMENT SYSTEM FOR INFLATABLE SPORTBOATS

BACKGROUND OF THE INVENTION

This invention relates to the use of a planing enhancement system for inflatable sportboats. Planing enhancement systems such as trim tabs and drive unit lifting plates are known to improve the stability and planing performance and weight carrying capacity of motor boats. Such systems are permanently attached to the boat or drive unit of an outboard and can either affect the storage or out of the water transport of an inflatable sportboat or outboard motor. For this reason they are somewhat limited in size and lift potential. Most trim tab and lifting plates also retain their wetted surface area and wetted surface drag at high or maximum planing speeds. These system lose efficiency at high speeds when less wetted surface area is required for the desired amount of lift for planing. One example of a system that eliminates wetted surface area by totally unsubmerging it's surface area is found in U.S. Pat. No. 5,224,436. The planing surface or hull extension is placed at an appropriate distance above the hull bottom surface. A "step" effect is featured whereby the surface area is not in contact with the water once planing commences.

BRIEF SUMMARY OF THE INVENTION AND OBJECTS

It is the general object of the present invention to provide a planing enhancement system for an inflatable sportboat, to provide the advantages of similar existing systems and exceeding performance on an inflatable sportboat without the disadvantages and limitations.

It is a further object to the present invention to provide a planing enhancement system with a proportionally large planing surface area that provides substantially more lift or increased planing weight capacity than existing trim tabs or drive unit limiting plates for an inflatable sportboat.

It is a further object to present invention to provide a planing enhancement system that attaches and detaches from the transom of an inflatable sportboat while in the water and won't affect it's storage or that of the outboard motor.

It is a further object to the present invention to provide a planing enhancement system that is ventilated with air from the top leading edge to reduce it's wetted surface area and drag at high planing speeds.

These and other features and objects of the invention will become apparent from the following detailed description when taken with the accompanying drawings and claims, of which:

BRIEF DESCRIPTION OF THE DRAWINGS

Corresponding reference numerals designate corresponding parts throughout the several views of the drawings.

DETAILED DESCRIPTION OF THE INVENTION

Figure 1:
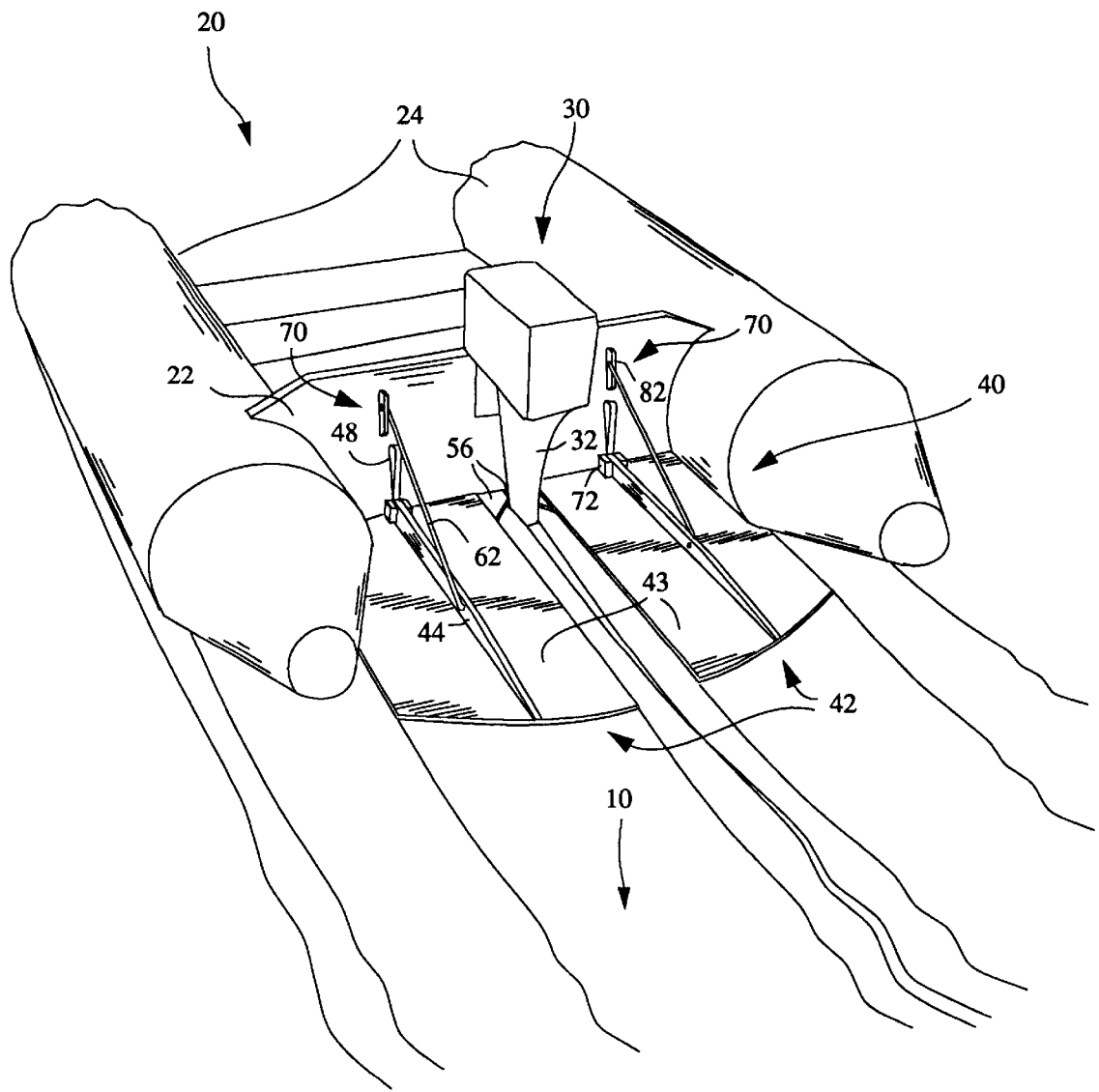
FIG. 1 is a perspective elevational view of a partial inflatable sportboat and transom utilizing the present invention.
Figure 2:
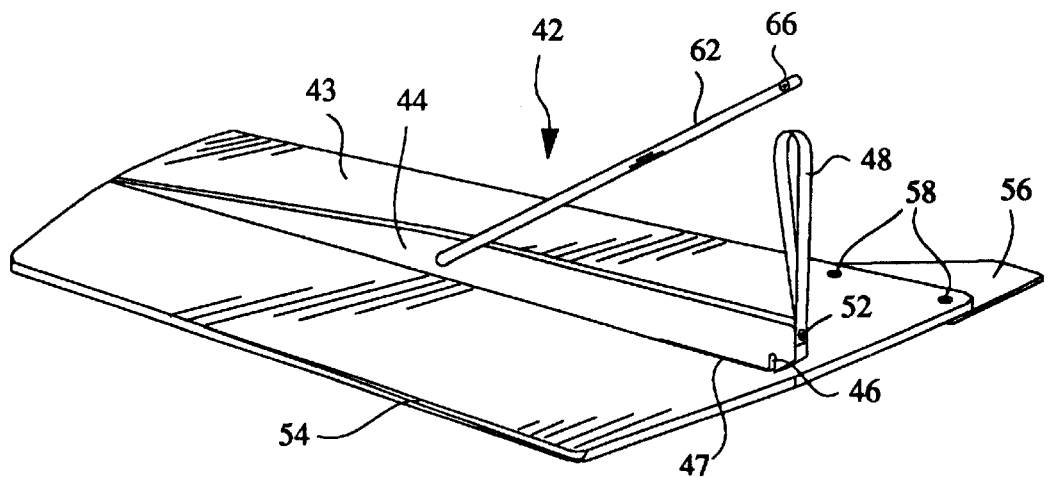
FIG. 2 is a perspective elevational view of a planing unit.
Figure 3:
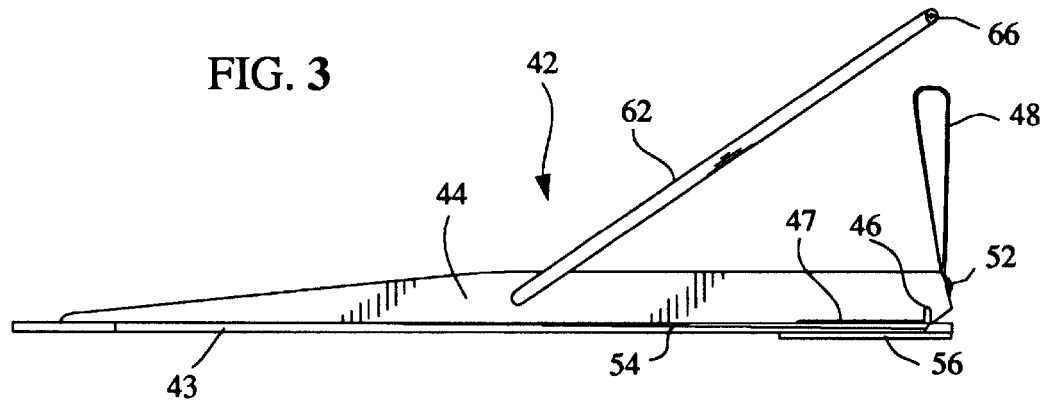
FIG. 3 is a side view thereof.
Figure 4:
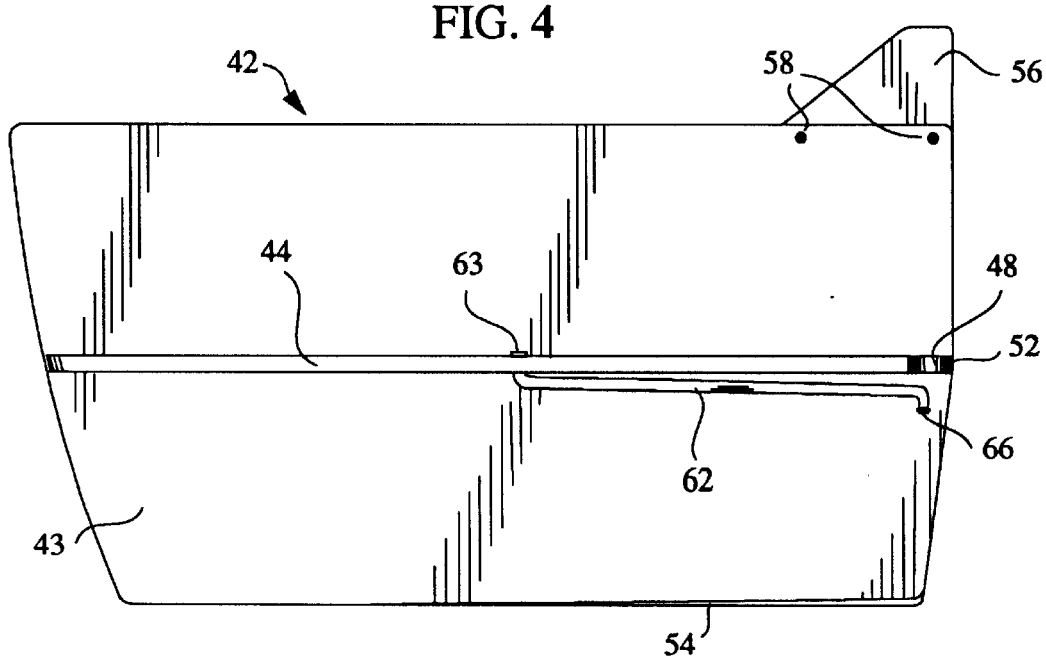
FIG. 4 is a top view thereof.

Referring now to the drawings, and more particularly to FIGS. 1 through 12, a maritime planing enhancement system 40 is provided for an inflatable sportboat 20 having a transom 22, a starboard and port side tube 24 and a hull bottom 26. A planing unit 42 which attaches and detaches to mounting brackets 70 which are permanently attached to the transom 22 of the inflatable sportboat 20. Both the planing unit 42 and mounting brackets 70 are comprised of plastic compatible with the injection molding process of fabrication. The planing unit 42 and mounting brackets 70 are attached and positioned on each side of the transom 22. The planing unit 42 on the starboard side is symmetrical with the planing unit 42 on the port side and they are evenly spaced between a drive unit 32 of an outboard motor 30. The attachment of the planing unit 42 is horizontally pivotal on a bottom mounting bracket 72 and a top mounting bracket 82 and also vertically pivotal on the bottom mounting bracket 72. The vertical angle of attack or trim of the planing unit 42 is selected using the top mounting bracket 82. The planing unit 42 is comprised of a planing plane 43 shaped to give the maximum lift by filling most of the area between the side tube 24 and drive unit 32, with enough space aft of the drive unit 32 to rotate the outboard motor 30 when turning. The aft end of the planing plate 43 extends out away from the transom 22 to an extent which doesn't adversely affect the turning capability of the inflatable sportboat 20, and is curved to reduce lateral drag while turning.

Figure 5:
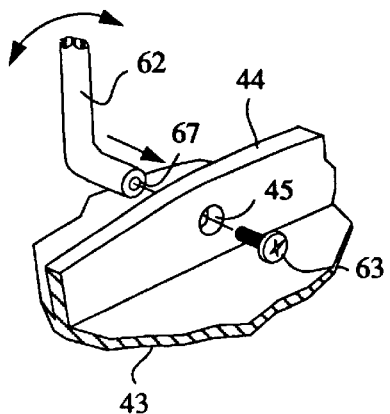
FIG. 5 is an enlarged fragmentary perspective ele-vational view of a support strut and a structural member.
Figure 6:
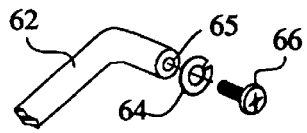
FIG. 6 is an enlarged fragmentary perspective ele-vational view of the top end of a support strut.

The planing unit 42 as shown in FIGS. 1 through 6 is comprised of the planing plate 43 which is smooth and flat on the bottom side for reduced drag in the water. The top side of the planing plate 43 is reinforced with a structural member 44 which also distributes the upward force to the lower bracket 72 and the support strut 62. A hook notch 46 on the end of the structural member 44 locks into the lower mounting bracket 72 and a strap 48 is used to release the lock. The top end of the support strut attaches to the top mounting bracket 82. A planing plate extension 56 is attached by rivets 58 to the planing plate 43 and fills in the area in front of the drive unit 32 to reduce water spray. The planing plate 43 has a contact area 54 which is rounded to butt up against the side tube 24 with minimal wear. The support strut 62 is made of anodized aluminum and connects to the structural member 44 to transfer force from the planing plate 43 to the top mounting bracket 82. The support strut 62 has a bend at the bottom end and the top end in opposite directions to counter the bending stresses on the support strut 62 itself. As shown in FIG. 5 the bottom end of the support strut 62 can rotate and is permanently attached to the structural member 44 through a hole 45 and secured with a screw 63 that screws into a hole 67. The top end of the support strut 62 as shown in FIG. 6 has a locking mechanism which locks into the top mounting bracket 82 and is comprised of a pressure collapsible washer 64 made of nylon and a screw 66 which screws into a hole 65.

Figure 7:
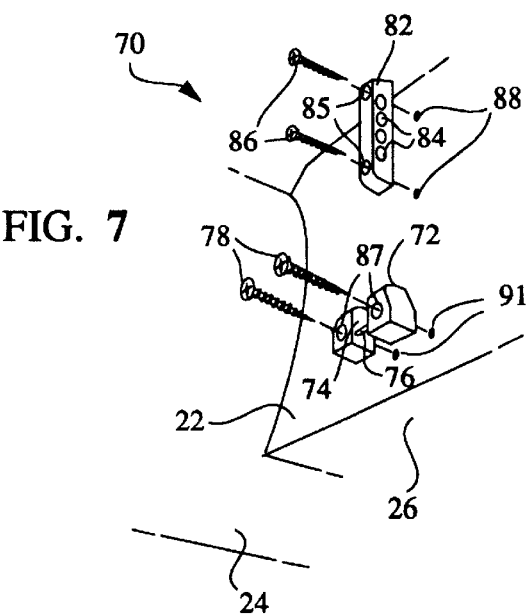
FIG. 7 is a bottom perspective view of a partial inflatable sportboat hull bottom and side tube and transom with attachment of mounting brackets.

The mounting brackets 70 as shown in FIG. 7 are permanently attached to the transom 22 of the inflatable sportboat 29 with screws 86 which go through holes 85 and into holes 88 and screws 78 which go through holes 87 and into holes 91. Bolts (not shown) are used with a transom 22 that is made of a thin, hard material such as aluminum. A template (not shown) is used to position and drill each of the holes 88, 91 into the transom 22 at the proper location. All mounting brackets 70 are installed using a marine grade sealant to prevent water intrusion into the transom 22.

Figure 8:
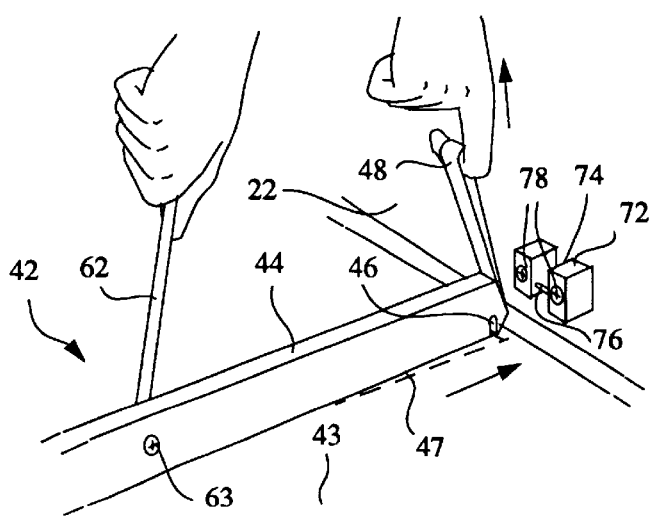
FIG. 8 is a perspective elevational view of a partial planing unit and transom with bottom mounting bracket.

As shown in FIG. 8, the mounting brackets 70 will quickly accept the planing unit 42 for attachment, with the bottom mounting bracket 72 which has a latch slot 74 in the middle where the structural member 44 inserts. The structural member 44 has a gap 47 which allows a hook notch 46 to be ben away from the planing plate 43 with a latch strap 48 to clear the latch bar 76 in the bottom mounting bracket 72 while insertion. When the latch strap 48 is released, the hook notch 46 locks down over the latch bar 76 and locks the structural member 44 in place.

Figure 9:
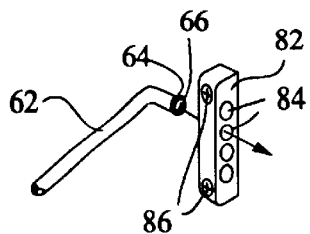
FIG. 9 is an enlarged fragmentary perspective ele-vational view of the top end of a support strut and a top mounting bracket.

The top mounting bracket 82 as shown in FIG. 9 has several selection holes 84 so different trim angles can be selected for the planing unit 43 using different holes for attachment. The mounting bracket hole 84 tapers to a smaller inside diameter at the center. When the end of the support strut 62 is inserted through the bracket hole 84 the collapsible washer 64 collapses while passing through the mounting bracket hole 84 and expands on the other side to hold the support strut 62 in place, and the planing unit 42 is completely attached. To detach the planing unit 42 the same procedure is followed in reverse and the planing unit 42 can be attached or detached with the inflatable sportboat 20 in the water 10.

Figure 10:
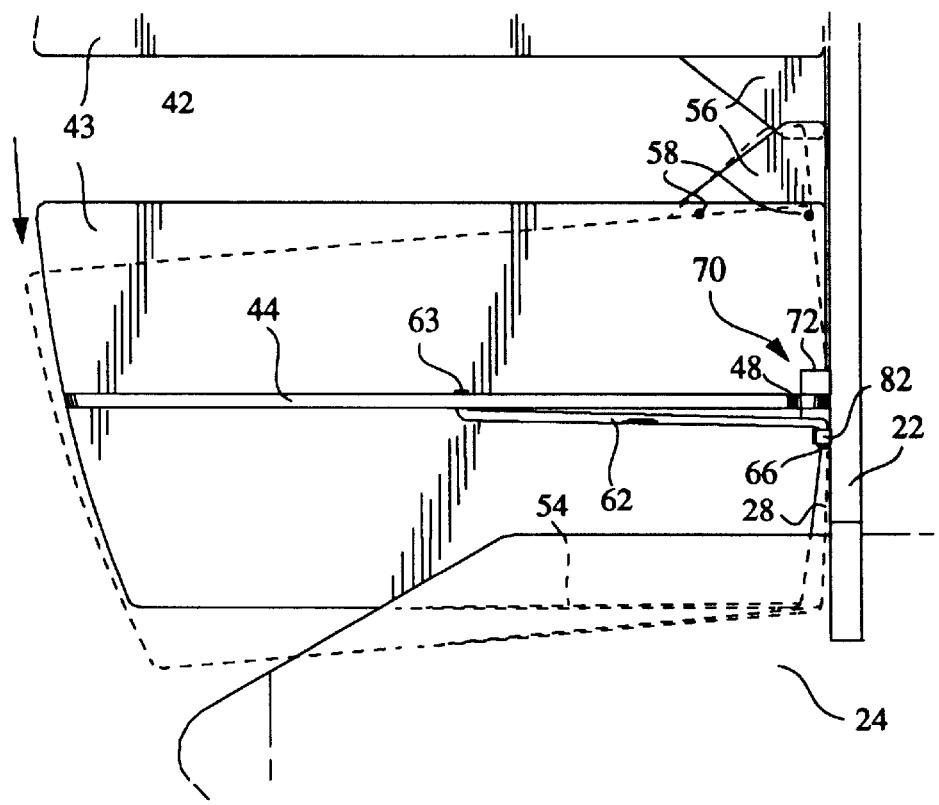
FIG. 10 is a top view of a partial side tube and transom with mounting brackets and attached planing unit.
Figure 11:
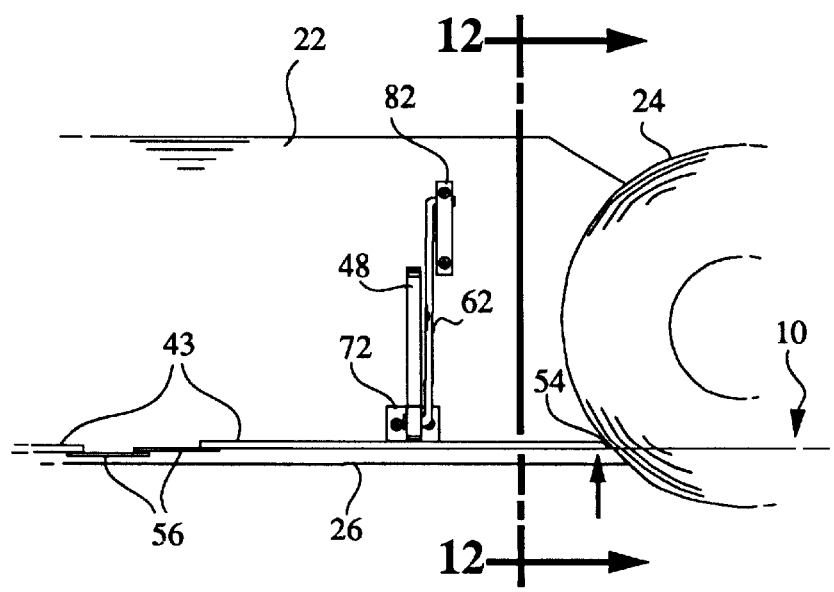
FIG. 11 is rear view thereof.
Figure 12:
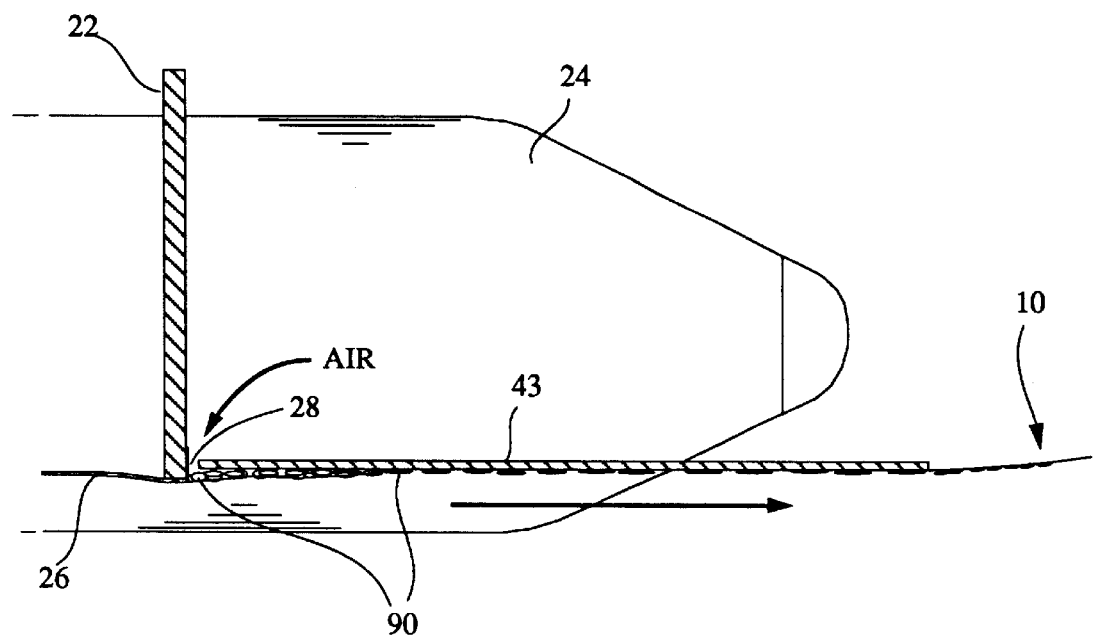
FIG. 12 is a sectional view taken substantially along line 12—12 in FIG. 11 of a planing unit and a transom and a hull bottom.

As show in FIGS. 10 and 11, besides the simplicity of a single bottom mounting bracket 72, the mount brackets 70 run nearly vertical and the planing unit 43 can hinge laterally parallel to the hull bottom 26; this movement gives the drive unit additional turning room when needed (FIG. 10). Also, unlike solid full length bottom hinges on most trim tabs, a single bottom mounting bracket 72 allows the full ventilation of air under the planing plate 43 as shown in FIG. 12. A ventilation gap 28 between the transom 22 and the planing plate 43 allows air to be sucked down (Venturi effect) and under the front end of the planing plate 43. The air mixes with the water 10 and creates air pockets and bubbles 90 which travel along with the water 10 which reduces direct contact of the planing plate 43 with the water 10 for less drag. A single bottom mounting bracket 72 is possible only because the planing plate 43 contact area 54 rests against the side tube 24 to support upward pressure as show FIG. 11. FIG. 11 also shows the overlap of each of the plate extensions 56 to accommodate different sized transoms 22.

Other embodiments of the invention have a plastic support strut 62 (not shown) which is hollow from the bottom and has an internal grid for strength. Also, a structural member 44 with several strength members which from a grid across the top surface of the planing plate 43 (not shown). This design is light in weight and every component is compatible with the injection molding process of fabrication.

What is claimed is:

1. A detachable planing enhancement system for an inflatable sportboat having a transom, a port and a starboard side tube and an outboard motor, with a lower drive unit, comprising:

a rigid plastic planing plate with a smooth flat bottom surface and an integral strength member on the top surface and a centrally attached diagonal pivotal support strut used for support, with said rigid plastic planing plate extending to fill the area between said side tube and said lower drive unit and extends aft of said side tube;

an attachment means for quick attachment and detachment of said rigid plastic plate and said support strut, each attachment pivotally to said transom of said inflatable sportboat thereof;

an air ventilation means to ventilate said rigid plastic planing plate with air along the leading edge of said rigid plastic planing plate and said ventilation means is comprised of a gap between the leading edge of said rigid plastic planing place and said transom.

2. The detachable planing enhancement system recited in claim 1 wherein said planing plate has said strength member which is compatible with the injection molding process of fabrication.

3. The detachable planing enhancement system recited in claim 1 wherein the aft edge of said rigid plastic planing plate curves out in the center to reduce lateral drag while turning said inflatable sport boat.

4. The detachable planing enhancement system recited in claim 1 wherein said rigid plastic planing plate extends aft to the farthest extent which will not adversely affect the handling and turning capability of said inflatable sportboat.

5. The detachable planing enhancement system recited in claim 1 wherein said rigid plastic planing plate fills in the area in front of said lower drive unit proximal to said transom.

6. The detachable planing enhancement system recited in claim 1 wherein said support strut is compatible with the injection molding process of fabrication.

7. The detachable planing enhancement system recited in claim 1 wherein said attachment means includes a top mounting bracket and a bottom mounting bracket which are permanently attached to said transom, and said rigid plastic planing plate attaches and detaches to said bottom mounting bracket and said support strut attaches and detaches to said top mounting bracket.

8. The detachable planing enhancement system recited in claim 7 further in which said rigid plastic planing plate attaches onto said bottom mounting bracket with a latch mechanism which has a release means to unlock said latch mechanism and detach said rigid plastic planing plate from said bottom mounting bracket.

9. The detachable planing enhancement system recited in claim 8 further in which said release means extends vertically upward from the front end of said rigid plastic planing plate above the water and is used as a guiding grip when attaching said rigid plastic planing plate to said bottom mounting bracket.

10. The detachable planing enhancement system recited in claim 9 further in which said release means consists of a hard plastic strap.

11. The detachable planing enhancement system recited in claim 7 further in which said support strut snaps into said top mounting bracket for attachment and snaps out of said top mounting bracket for detachment.

12. The detachable planing enhancement system recited in claim 11 further in which said top mounting bracket has several attachment locations positioned vertical from each other and said support strut snaps into different attachment locations for the selection of trim angle of said rigid plastic planing plate relative to said transom and snaps out of said top mounting bracket for detachment.

13. The detachable planing enhancement system received in claim 7 wherein said top mounting bracket and said bottom mounting bracket are designed to be made with the injection molding process of fabrication.

14. The detachable planing enhancement system recited in claim 13 further in which said top mounting bracket and said bottom mounting bracket are made of polypropylene.

15. The detachable planing enhancement system recited in claim 6 further in which said support strut is made of polypropylene.

16. The detachable planing enhancement system recited in claim 2 further in which said rigid plastic planing plate is made of polyproplene.

\* \* \* \* \*